(12) United States Patent
Ueki

(10) Patent No.: US 7,352,409 B2
(45) Date of Patent: Apr. 1, 2008

(54) BLUE STRETCH CIRCUIT AND LEVEL DETECTION CIRCUIT

(75) Inventor: Keijiro Ueki, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 538 days.

(21) Appl. No.: 10/407,110

(22) Filed: Apr. 4, 2003

(65) Prior Publication Data

US 2003/0189672 A1    Oct. 9, 2003

(30) Foreign Application Priority Data

Apr. 9, 2002  (JP)  ............................. 2002-106315

(51) Int. Cl.
*H04N 1/46* (2006.01)
*H04N 9/64* (2006.01)
*H04N 9/73* (2006.01)

(52) U.S. Cl. .................. 348/649; 348/223.1; 348/655; 358/516

(58) Field of Classification Search ................ 348/649, 348/655, 223.1; 358/516; *H04N 9/73*
See application file for complete search history.

(56) References Cited

U.S. PATENT DOCUMENTS

| 4,599,643 | A | * | 7/1986 | Harlan ........................ 348/380 |
|---|---|---|---|---|
| 4,922,330 | A | * | 5/1990 | Saito et al. ............... 348/225.1 |
| 5,146,316 | A | * | 9/1992 | Suzuki ..................... 348/227.1 |
| 5,153,713 | A | * | 10/1992 | Kyuma et al. ............... 348/655 |
| 5,175,615 | A | * | 12/1992 | Ohara ...................... 348/223.1 |
| 5,262,848 | A | * | 11/1993 | Kim ........................ 348/223.1 |
| 5,530,474 | A | * | 6/1996 | Takei ....................... 348/224.1 |
| 5,644,360 | A | * | 7/1997 | Gurley et al. ............... 348/381 |
| 5,654,753 | A | * | 8/1997 | Takei ....................... 348/223.1 |
| 5,712,691 | A | * | 1/1998 | Brennesholtz .............. 348/744 |
| 6,008,863 | A | * | 12/1999 | Jinnai .......................... 348/655 |
| 6,344,873 | B1 | * | 2/2002 | Matsushima ................. 348/96 |
| 6,392,344 | B1 | * | 5/2002 | Hong ......................... 313/586 |
| 6,429,905 | B1 | * | 8/2002 | Yamamoto .................. 348/656 |
| 6,704,046 | B2 | * | 3/2004 | Dyas et al. ............... 348/223.1 |
| 6,798,155 | B2 | * | 9/2004 | Kim et al. ............. 315/368.21 |
| 6,891,564 | B2 | * | 5/2005 | Fujimori et al. ............. 348/173 |
| 2003/0184660 | A1 | * | 10/2003 | Skow ....................... 348/223.1 |

FOREIGN PATENT DOCUMENTS

| JP | 56116391 | 9/1981 |
|---|---|---|
| JP | 04357790 | 12/1992 |
| JP | 06245224 | 9/1994 |
| JP | 08102958 | 4/1996 |

\* cited by examiner

*Primary Examiner*—Brian P. Yenke
(74) *Attorney, Agent, or Firm*—Fish & Richardson P.C.

(57) ABSTRACT

A blue stretch circuit of this invention has a first voltage detection circuit and a second voltage detection circuit, each of which detects that an amount of each of the first and the second color difference signals are within a predetermined range, a blue stretch control circuit which generates a control signal for blue stretching according to output signals of the voltage detection circuits and a level of a brightness signal and a B drive circuit to amplify a blue color signal according to an output signal of the blue stretch control circuit.

1 Claim, 4 Drawing Sheets

BLUE STRETCH CIRCUIT AND LEVEL DETECTION CIRCUIT

BACKGROUND OF THE INVENTION

1. Field of the Invention

This invention relates to a blue stretch circuit used in a TV receiver to brighten white, specifically to a blue stretch circuit with a level detection circuit which enables discerning that a level of an input signal is within a predetermined range of a reference level of a reference voltage supply using a single reference voltage supply.

2. Description of the Related Art

When white color is displayed on a TV screen, there are occasions in which the white color looks yellowish white rather than bright white. In that case, it is known that stressing blue color out of three primary colors, i.e. red (R), green (G) and blue (B), eliminates the yellowish tint and makes it bright white.

For this reason, a blue stretch circuit, which stresses blue color when it automatically detects a received color signal is white, has been bought into use. Stressing blue color can be made by increasing a gain of a B drive circuit which amplifies a blue color signal.

However, there is no simple method with conventional blue stretch circuit to detect that a received chroma signal is for white color. Another difficulty is that a level detection circuit having a simple configuration and suitable to implement in an integrated circuit is not available, while a precise level detection is required when judging the white signal with the level of the signal.

SUMMARY OF THE INVENTION

A blue stretch circuit of this invention has voltage detection circuits which detect that amounts of a first and a second color difference signals are within predetermined ranges and a means to amplify a blue color signal according to output signals of the voltage detection circuits.

A blue stretch circuit of this invention has the voltage detection circuits which detect that the amounts of the first and the second color difference signals are within the predetermined ranges, a blue stretch control circuit which generates a control signal for the blue stretching according to the output signals of the voltage detection circuits and a level of a brightness signal and the mean to amplify a blue color signal according to an output signal of the blue stretch control circuit.

A level detection circuit of this invention detects that a level of an input signal is within a predetermined range of a reference level of a reference voltage supply using a single reference voltage supply, and includes a first comparison portion which generates a discrimination output signal when the level of the input signal is smaller than the reference level of the reference voltage supply and a second comparison portion which generates a discrimination output signal when the level of the input signal is larger than the reference level of the reference voltage supply.

DETAILED DESCRIPTION OF THE INVENTION

Next, an embodiment of this invention will be explained referring to FIG. 1.

Figure 1:
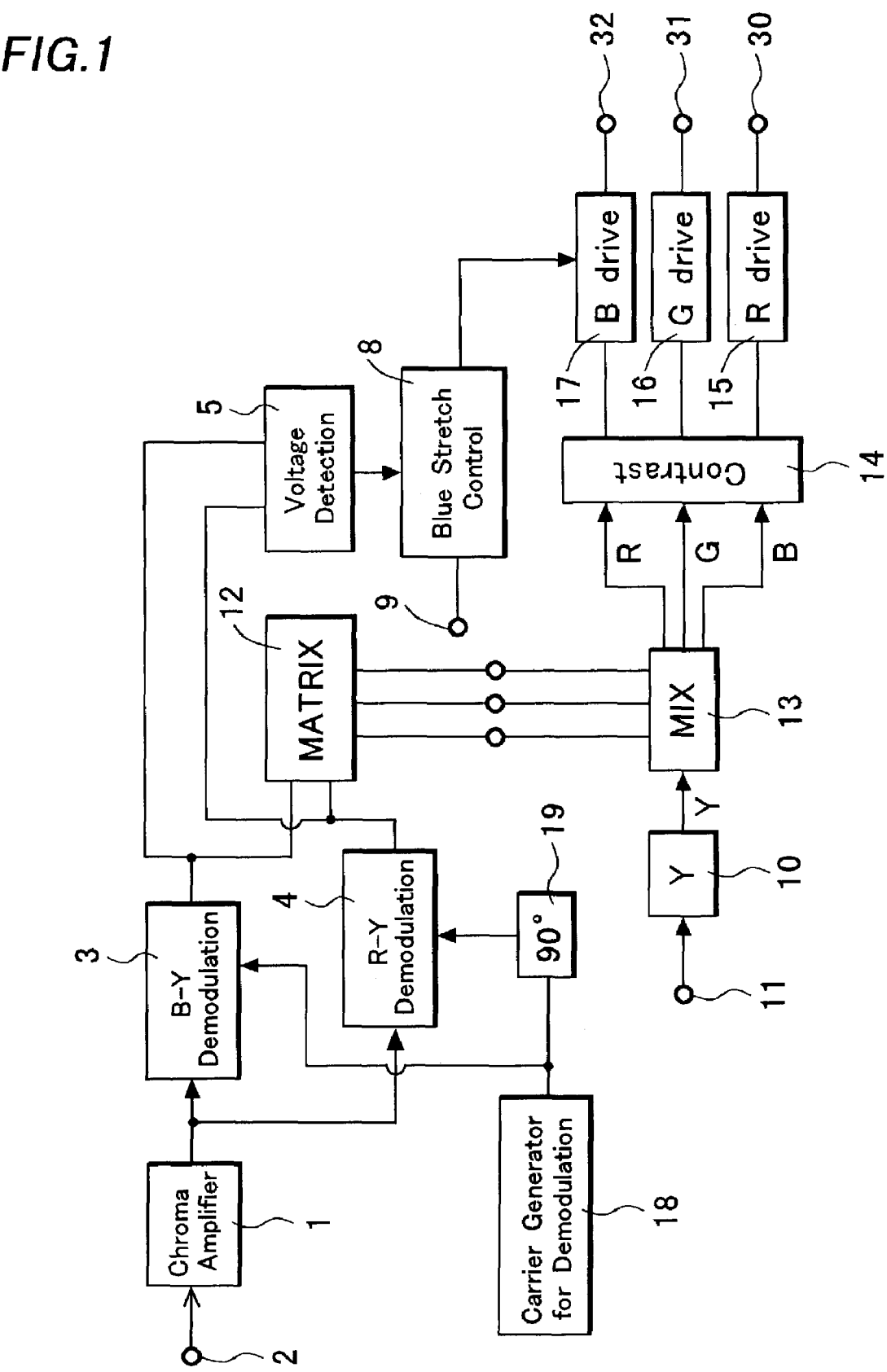
FIG. 1 is a block diagram showing a blue stretch circuit according to an embodiment of this invention.

FIG. 1 shows a blue stretch circuit disposed in a color signal processing circuit of a TV receiver.

A chroma amplifier 1 amplifies a chroma signal from a terminal 2. A B-Y demodulator 3 demodulates the chroma signal amplified with the chroma amplifier 1 to obtain a B-Y signal component. An R-Y demodulator 4 demodulates the chroma signal amplified with the chroma amplifier 1. to obtain an R-Y signal component.

A voltage detection circuit 5 includes a first voltage detection circuit 6 (not shown) to detect that the B-Y signal from the B-Y demodulator 3 is at or below a predetermined level and a second voltage detection circuit 7 (not shown) to detect that the R-Y signal from the R-Y demodulator 4 is at or below a predetermined level, and detects a white signal which is subject to blue stretching. A blue stretch control circuit 8 generates a control signal for the blue stretching according to an output signal of the voltage detection circuit 5 and a brightness signal (Y) from a terminal 9.

A brightness signal processing circuit 10 makes amplification and sharpness adjustment of the brightness signal (Y) from a terminal 11. A matrix circuit 12 generates a G-Y signal from the R-Y signal and the B-Y signal, and outputs the G-Y signal together with the R-Y signal and the B-Y signal. A mixer 13 generates three primary color signals from the brightness signal from the brightness signal processing circuit 10 and the G-Y signal, R-Y signal and the B-Y signal from the matrix circuit 12.

A contrast circuit 14 adjusts contrasts of the three primary color signals. R drive circuit 15, G drive circuit 16 and B drive circuit 17 make power amplification of the contrast-adjusted three primary color signals.

Next, operation of the circuit having a configuration shown in FIG. 1 is explained. A carrier generation circuit for demodulation 18 provides the B-Y demodulator 3 and the R-Y demodulator 4 with carrier signals with 90 degree phase difference from each other, using a 90 degree phase shifter 19. Herewith, the B-Y demodulator 3 and the R-Y demodulator 4 demodulate the color difference signals and provide demodulated outputs (B-Y signal and R-Y signal) to the voltage detection circuit 5. The voltage detection circuit 5 discerns that a received signal is for white color based on levels of the B-Y signal and the R-Y signal.

Figure 2:
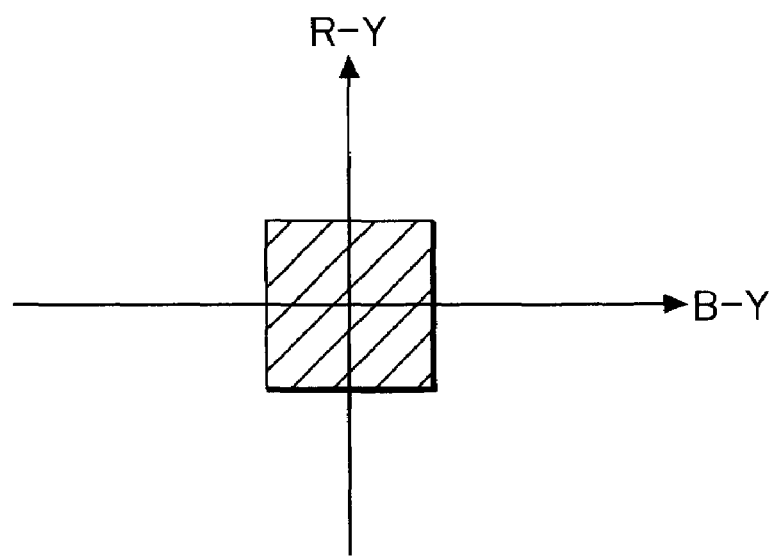
FIG. 2 is a vector diagram of a color difference signal according to the embodiment of this invention.
Figure 3A:
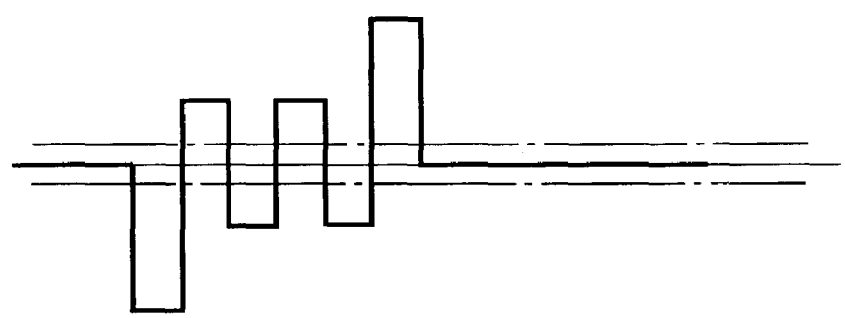
FIG. 3A and FIG. 3B show relationship between waveforms of the color difference signals and level detection ranges according to the embodiment of this invention.
Figure 3B:
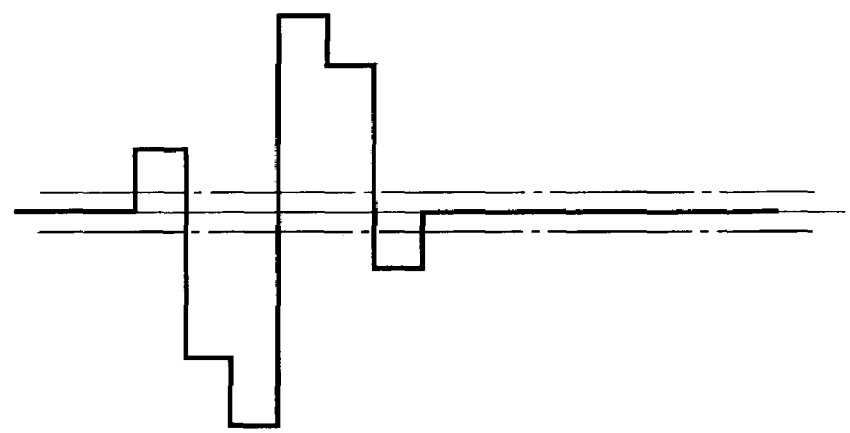
Figure 4:
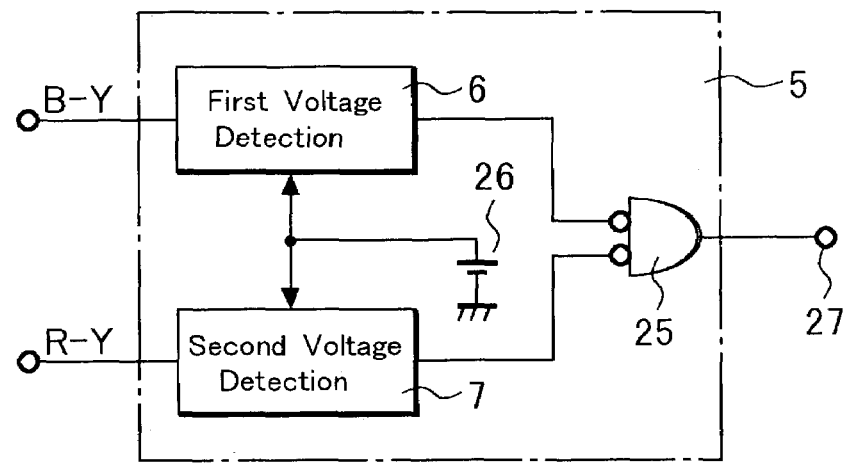
FIG. 4 is a block diagram showing an interior of the voltage detection circuit 5 in FIG. 1.

The operation is explained referring to FIG. 2 and FIG. 3. FIG. 2 is a vector diagram of a color difference signal, taking the B-Y signal and the R-Y signal as axes. Shaded area in FIG. 2 is detected as a white signal region in this invention. For that purpose, the voltage detection circuit 5 is set to detect a signal with a B-Y signal level between a pair of chain lines out of the B-Y signal indicated in solid lines in FIG. 3A and with an R-Y signal level between a pair of chain lines out of the R-Y signal indicated in solid lines in FIG. 3B. An example of the voltage detection circuit 5 is shown in FIG. 4. The voltage detection circuit 5 has a first voltage detection circuit G to detect that the B-Y signal is between the levels indicated with the pair of chain lines in FIG. 3A and a second voltage detection circuit 7 to detect that the R-Y signal is between the levels indicated with the pair of chain lines in FIG. 3B, an AND gate 25 to carry out logical AND between the reversed output of the first voltage detection circuit 6 and the reversed output of the second voltage detection circuit 7 and a reference voltage supply 26 to define a reference level of the voltage detection circuits 6 and 7.

The first voltage detection circuit 6 generates an "L" level signal when the B-Y signal falls within a range of Vref±α, where Vref is a voltage of the reference voltage supply 26. The range of ±α is equivalent with the region between the pair of chain lines in FIG. 3A. The second voltage detection circuit 7 also generates an "L" level signal in the same operation.

Thus when incoming signal falls in the shaded region in FIG. 2, the AND gate 25 generates an "H" level control signal at an output terminal 27. The voltage of the reference voltage supply 26 is applied to both of the voltage detection circuits 6 and 7, since the shaded area in FIG. 2 is a square. If the shaded area is a rectangle, two reference voltage supplies, each having different reference voltage from the other, are used to provide each reference voltage to each of the voltage detection circuits 6 and 7, respectively.

Hence, the white signal can be detected according to the voltage detection circuit 5 in FIG. 1.

The "H" level signal from the voltage detection circuit 5 in FIG. 1 is provided to the blue stretch control circuit 8. The blue stretch control circuit 8 increases a gain of the B drive circuit 17, judging to carry out the blue stretching when the level of the brightness signal is 40IRE or above and the "H" level signal is provided from the voltage detection circuit 5.

On the other hand, the brightness signal (Y) goes through the brightness signal processing circuit 10 and the mixer 13 and is converted to the primary color signals R, G and B, which are provided to the R drive circuit 15, the G drive circuit 16 and the B drive circuit 17, through the contrast circuit 14. As a result, a bright white derived from the blue stretch function can be displayed on the screen, when the primary color signals from the terminals 30, 31 and 32 are used.

Figure 5:
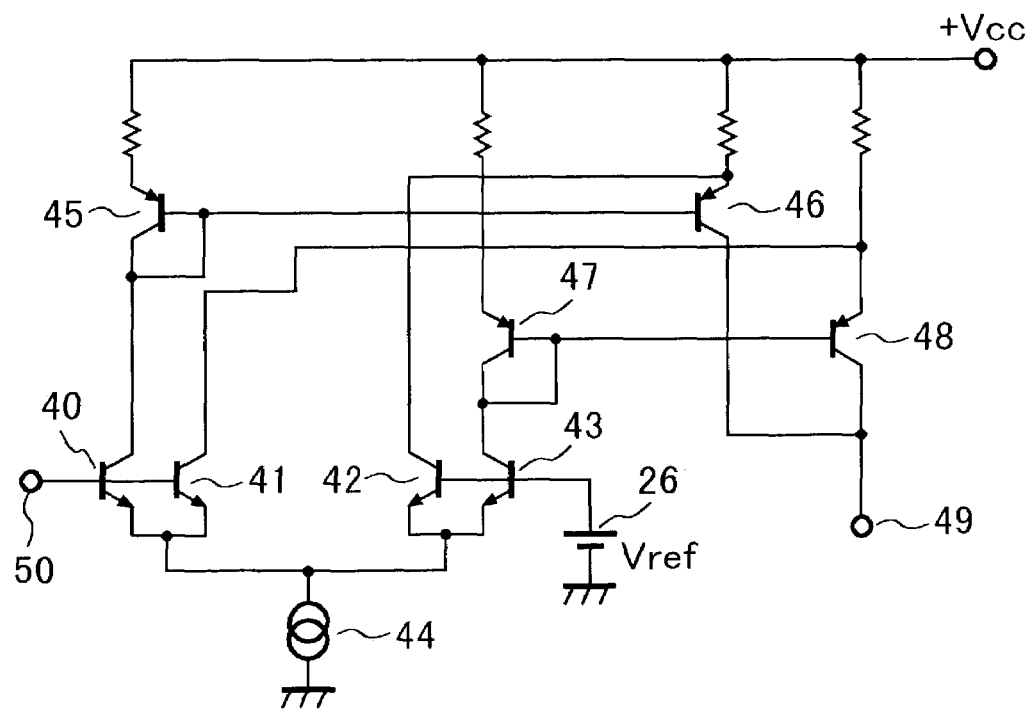
FIG. 5 is a schematic circuit diagram showing an example circuit of the voltage detection circuit in FIG. 4.

Next, an example circuit of either of the first voltage detection circuit 6 and the second voltage detection circuit 7 is shown in FIG. 5. The voltage detection circuit 6 and the voltage detection circuit 7 detect the range of ±α, which is a slight deviation from the voltage Vref of the reference voltage supply 26. Therefore, very high discrimination sensitivity is required. Since the voltage detection circuit is to detect a certain range, using a window comparator with two reference levels is conceived. However, it takes a lot of time and effort to provide two independent reference levels, when high discrimination sensitivity is required. Hence, the inventor devised a circuit which detects the range of ±α, which is a slight deviation from the voltage Vref, using a single reference Voltage supply.

Figure 6:
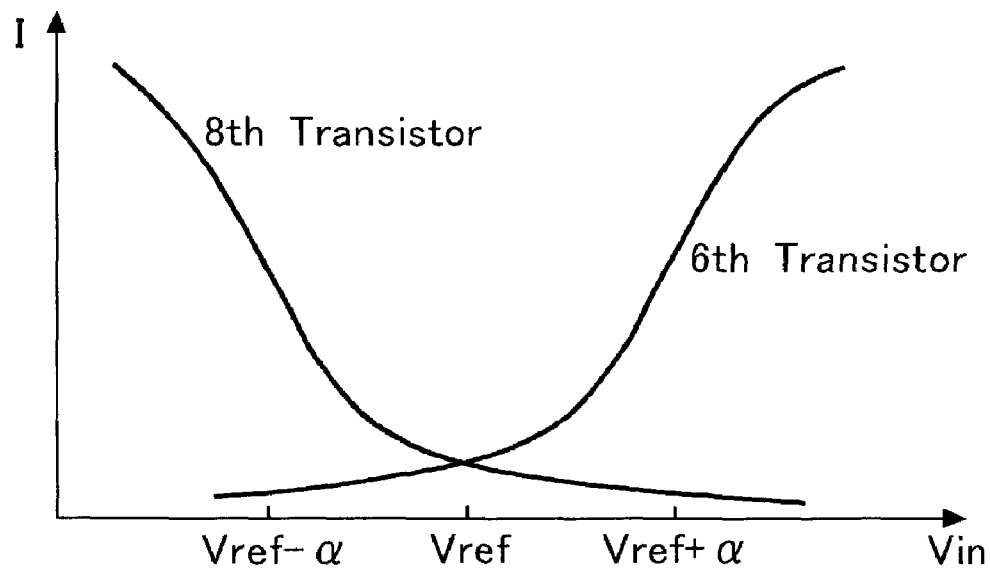
FIG. 6 shows an output current waveform of the voltage detection circuit in FIG. 5.

A circuit diagram of an example of such a voltage level detection circuit is shown in FIG. 5. An input signal is applied to bases of a first transistor 40 and a second transistor 41. A reference voltage Vref of a reference voltage supply 26 is applied to bases of a third transistor 42 and a fourth transistor 43. A current source 44 provides a current to commonly connected emitters of the first transistor 40, the second transistor 41, the third transistor 42 and the fourth transistor 43. A collector of the first transistor 40 is connected to a collector of a diode-connected fifth transistor 45. A base of the fifth transistor 45 is connected to a base of a sixth transistor 46, an emitter of which is connected to a collector of the third transistor 42. A collector of the fourth transistor 43 is connected to a collector of a diode-connected seventh transistor 47. A base of the seventh transistor 47 is connected to a base of an eighth transistor 48, an emitter of which is connected to a collector of the second transistor 41. An output signal is provided from an output terminal 49 connected with collectors of the sixth transistor 46 and the eighth transistor 48. Operation of the circuit shown in FIG. 5 is explained referring to FIG. 6 showing relationship between an input voltage Vin and an output current I. The input voltage Vin at an input terminal 50 is shown on a horizontal axis and the output current I from the output terminal 49 is shown on a vertical axis in FIG. 6. When the input voltage Vin at the input terminal 50 is Vref−α in FIG. 6, collector currents of the first transistor 41 and the second transistor 41 are small while collector currents of the third transistor 42 and the fourth transistor 43 are large. Then a base voltage of the sixth transistor 46 goes up while an emitter voltage of it goes down. Thus the sixth transistor 46 tends to turn off and no collector current flows, as shown in FIG. 6. On the other hand, a base voltage of the eighth transistor 48 goes down while an emitter voltage of it goes up. Thus the eighth transistor 48 tends to turn on and a collector current flows, as shown in FIG. 6.

At this time, the sixth transistor 4(6 and the eighth transistor 48 turn on and off faster than in normal operation, since a voltage between the base and the emitter of each of the transistors is decreased or increased by changes in both of the base and the emitter voltages. In other words, the sixth transistor 46 and the eighth transistor 48 begin inversion when the input voltage Vin at the input terminal 50 goes higher or lower than the reference voltage Vref slightly. Strength of the inversion can be varied by changing an internal resistance Re of each of the first through fourth transistors 40-43 by changing a current value of the current source 44.

When the input voltage Vin at the terminal 50 goes up toward Vref+α shown in FIG. 6 from status described above, the voltage between the base and the emitter of the sixth transistor 46 increases to increase its collector current. On the contrary, the voltage between the base and the emitter of the eighth transistor 48 decreases to reduce its collector current.

A U-shaped output current I is obtained, when the result is expressed in the output current I flowing through the output terminal 49. As seen from FIG. 6, the discrimination output signal (current) is generated from the eighth transistor 48 functioning as the first comparison portion, when the input voltage Vin is lower than the reference voltage Vref of the reference voltage supply 26. Also the discrimination output signal (current) is generated from the sixth transistor 46 functioning as the second comparison portion, when the input voltage Vin is higher than the reference voltage Vref of the reference voltage supply 26.

Figure 7:
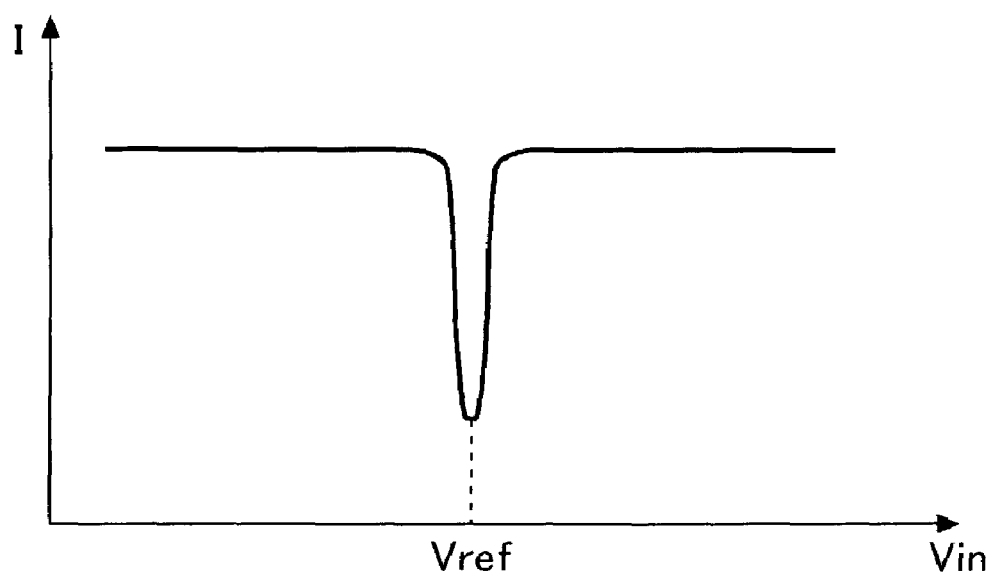
FIG. 7 shows an outline of the output current waveform in FIG. 6.

FIG. 7 shows a macroscopic characteristic diagram of FIG. 6. As seen from FIG. 7, the circuit depicted in FIG. 5 shows rapid decrease in the output current I, when the input voltage Vin is near the reference voltage Vref. Hereby detecting the input voltage Vin near the reference voltage Vref is made possible.

Hence, precise detection of the white signal with a single reference voltage is made possible, when the voltage detection circuit in FIG. 5 is applied to the voltage detection circuits in FIG. 4.

According to this invention, a white signal can be easily detected, because a chrome signal for white color can be detected by finding that levels of the R-Y signal and the B-Y signal are within the predetermined range. Also, since detecting levels around the reference level is made with a single reference level according to this invention, both maximum and minimum detection levels are not varied by variations of elements when implemented in an integrated circuit. That is, even if the value of the reference level is varied when implementing in the integrated circuit, difference between the maximum value and the minimum value does not vary.

Furthermore, only one reference voltage supply is required and thus the number of the elements does not increase, since a single reference level is enough according to this invention.

Also according to this invention, the judging level of the voltage detection can be easily changed by changing a value of operation current source of the differential amplifier.

What is claimed is:

1. A blue stretch circuit comprising:

a voltage detection circuit which detects a white signal when an amount of each of a first and a second color difference signals is within a predetermined range;

a blue stretch control circuit which generates a control signal for blue stretching according to an output signal of the voltage detection circuit and a level of a brightness signal;

an amplifier circuit to increase a level of a blue color signal according to an output signal of the blue stretch control circuit, wherein the voltage detection circuit comprises a first voltage detection circuit which detects that an amount of the first color difference signal is within a predetermined range and a second voltage detection circuit which detects that an amount of the second color difference signal is within a predetermined range; and a logic gate which detects the white signal when the output signals of the first voltage detection circuit and the second voltage detection circuit are the same.

* * * * *